F. TUXWORTH.

BRAKE FOR SAW MILL LOG CARRIAGES.

No. 9,916. Reissued Nov. 1, 1881.

WITNESSES

A. B. Robertson.

O. Turner.

INVENTOR

F. Tuxworth.

BY T. J. W. Robertson.

ATTORNEY.

N. PETERS, Photo-Lithographer, Washington, D. C.

UNITED STATES PATENT OFFICE.

FRANK TUXWORTH, OF MANISTEE, MICHIGAN.

BRAKE FOR SAW-MILL LOG-CARRIAGES.

SPECIFICATION forming part of Reissued Letters Patent No. 9,916, dated November 1, 1881.

Original No. 237,457, dated February 8, 1881. Application for reissue filed June 24, 1881.

*To all whom it may concern:*

Be it known that I, FRANK TUXWORTH, of Manistee, Manistee county, Michigan, have invented a new and useful Brake for Saw-Mill Log-Carriages, (which has not been patented, to my knowledge or by my consent, in any foreign country,) of which the following is a specification, illustrated by the accompanying drawings.

My invention relates to what may be called "clamp-brakes;" and the object of my improvement is to apply the brake directly to saw-mill log-carriages.

Figure 1:
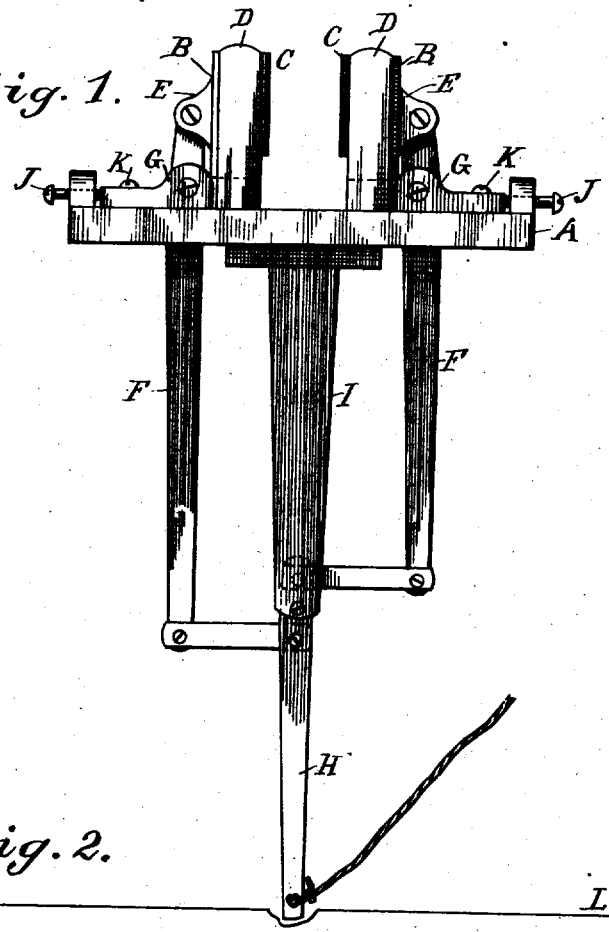
Figure 2:
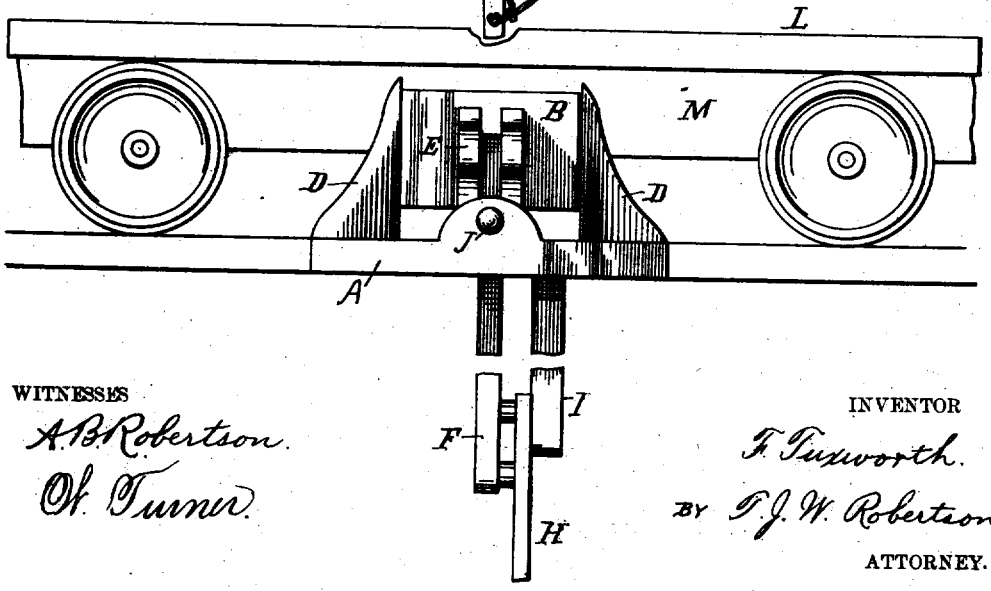

Figure 1 of the drawings is a vertical end view of the brake. Fig. 2 is a side view of the brake applied to the rack-rail of the saw-mill log-carriage.

The same letters represent the same parts throughout the drawings.

A, Fig. 1, is the bed-plate of the brake, for attachment to the floor or other environment.

B B are pad-boxes, filled with pressed paper exposed edgewise, or other material suitable for braking purposes.

C C are the brake-pads, consisting of pressed paper projecting edgewise, or other material suitable for braking purposes.

D D are braces or abutments, rigid with the bed-plate A, one at each end of the pad boxes, to keep the latter from rocking or swerving on the pressure being applied.

E E are lugs and pivots on the backs of the pad-boxes, for attaching the operating-levers.

F F are operating-levers, attached by pivot and lug to the backs of the pad-boxes.

G G are adjustable fulcrums, with pivots for operating-levers, proper set-screws, and bolts for securing the fulcrums to the bed-plate.

H is a connecting-lever, attached by pivot to standard-fulcrum I, and by connecting-rods to levers F F, for operating the latter. The long arm of the connecting-lever H should be of sufficient gravity of itself, or be so weighted, as to regain its perpendicular position and to open the brake on the braking-power being relaxed.

I is a standard-fulcrum attached rigidly to the bed-plate A, and having pivot for connecting-lever H.

J J are set-screws for adjusting the fulcrums G G.

K K are bolts for securing fulcrums G G, when properly adjusted, to the bed-plate A.

L, Fig. 2, is the saw-mill carriage.

M is a rack rail or projection of the saw-mill carriage, attached firmly thereto and running longitudinally therewith, and passing between the brake-pads C C.

As will be readily seen by the drawings, when the connecting-lever H is operated by a cord or chain—say extending from the end of its long arm over a pulley to a foot-lever or other power—it in turn will operate the levers F F, throwing out their long arms and bringing their short arms and the attached brake-pads together upon the rack rail or projection M, Fig. 2, thus braking up the motion of the saw-mill carriage. When the pressure of the foot or other power is removed the gravity or added weight of the long arm of the lever H will bring that lever to a perpendicular position again, bringing out their short arms, and thus relaxing the attached brake-pads and relieving the rack rail or projection of the carriage.

What I claim as new is—

1. In a brake for saw-mill log-carriages, the abutments or braces D, secured to a suitable base independent of the carriage, in combination with the pad-boxes B, adapted to move between said abutments, substantially as described.

2. The abutments or braces D, secured to a suitable base independent of the log-carriage, as described, in combination with the pad-boxes and pads B C, moving between said abutments, mechanism, substantially as described, for moving said pad-boxes to and from each other, and a rail or projection on the log-carriage adapted to slide between the pad-boxes, as and for the purpose specified.

3. A clamp-brake for saw-mill log-carriages, having pad-boxes B B and brake-pads C C, consisting of pressed paper exposed edgewise, substantially as shown and described, and for the purpose set forth.

4. A clamp-brake for saw-mill log-carriages having pad-boxes B B, brake-pads C C, and suitable operating-levers, F F, combined with rail or projection M on saw-mill carriages, as and for the purpose set forth.

5. The brake mechanism for saw-mill log-carriages, consisting, essentially, of the jaws of the clamp-brake operated by suitable levers, as described, and located between the abutments D D, as shown, combined with the rail or projection on the carriage, substantially as shown and described, and for the purpose set forth.

6. The combination of the jaws of the clamp-brake, working between abutments D D, and the levers F H, fulcrumed as described, with the saw-mill carriage having a projection, as M, substantially as shown and described, and for the purpose set forth.

7. The clamping-jaws pivoted on levers F, the levers F F, pivoted on sliding blocks or fulcrums G G, which are adjustable by set-screws, as shown, and the lever H and its connections, all operating in combination, substantially as shown and described, and for the purpose set forth.

FRANK TUXWORTH.

Witnesses:
N. W. NELSON,
WILSON H. GRAY.